(12) United States Patent
Lee

(10) Patent No.: US 7,059,673 B1
(45) Date of Patent: Jun. 13, 2006

(54) SEAT DEVICE FOR A BICYCLE

(76) Inventor: Daniel Lee, No. 323, Chung-Hua Rd., Nantou City (TW)

( * ) Notice: Subject to any disclaimer, the term of this patent is extended or adjusted under 35 U.S.C. 154(b) by 0 days.

(21) Appl. No.: 11/132,111

(22) Filed: May 18, 2005

(51) Int. Cl.
*B62J 1/00* (2006.01)
(52) U.S. Cl. .............................. 297/195.1; 297/215.16
(58) Field of Classification Search ............ 297/195.1, 297/214, 215.16
See application file for complete search history.

(56) References Cited

U.S. PATENT DOCUMENTS

| 3,758,154 A * | 9/1973 | Kitaguchi .................. 297/214 |
| 5,921,624 A * | 7/1999 | Wu .......................... 297/195.1 |
| 6,443,524 B1 * | 9/2002 | Yu ........................... 297/195.1 |
| 6,561,578 B1 * | 5/2003 | Mel ......................... 297/195.1 |
| 6,773,061 B1 * | 8/2004 | Shu .......................... 297/195.1 |
| 6,899,389 B1 * | 5/2005 | Saccucci ................ 297/215.15 |

* cited by examiner

*Primary Examiner*—Peter R. Brown
(74) *Attorney, Agent, or Firm*—Grossman Tucker Perreault & Pfleger, PLLC

(57) ABSTRACT

A seat device includes a seat body converging from rear to front portion and having top and bottom faces, a bent frame having a bent front end and two diverging arms, a front connecting unit molded over the front end of the bent frame, a rear connecting unit molded over the diverging arms of the bent frame, and front and rear fixing units to fix the front and rear connecting units to the front and rear portions of the seat body, respectively. The front fixing unit includes a stud, and a socket to receive fittingly the stud of the front fixing unit. The rear fixing unit includes a stud, and a socket to receive fittingly the stud of the rear fixing unit.

3 Claims, 6 Drawing Sheets

SEAT DEVICE FOR A BICYCLE

BACKGROUND OF THE INVENTION

1. Field of the Invention

The invention relates to a seat device, more particularly to a seat device for a bicycle.

2. Description of the Related Art

Referring to FIG. 1, a conventional seat device 1 includes a rigid casing 11, a cushion portion 12 formed on top of the casing 11, a supporting frame 13 mounted on a bottom face of the casing 11, and a fastening unit 14 for fastening the supporting frame 13 to the casing 11. The casing 11 converges from a rear portion 113 to a front portion 112, and includes a positioning piece 114 formed on the bottom face thereof proximate to the front portion 112, and two insert seats 115 formed on the bottom face thereof proximate to the rear portion 113. The supporting frame 13 includes a bent front section 131 inserted within the positioning piece 114, and two diverging arm sections 132 inserted respectively into the insert seats 115. The fastening unit 14 includes a cover plate 141 covering the front section 131 of the supporting frame 13, and a pair of screws 142 that extend through the cover plate 141 and that engage threadedly the positioning piece 114 so as to fix the supporting frame 13 to the casing 11.

Although the aforementioned conventional seat device 1 can achieve its intended purpose, the casing 11 has to be preformed with the positioning piece 114 and the insert seats 115, and has to be processed with insert holes and screw holes, so that formation of the casing 11 is complicated. Further, fixing the supporting frame 13 to the casing 11 is also complicated because the supporting frame 13 first has to be positioned on the casing 11 prior to being fastened to the casing 11 by the fastening unit 14.

SUMMARY OF THE INVENTION

Therefore, the object of the present invention is to provide a seat device that has a simple structure and that can be easily assembled.

According to one aspect of this invention, a seat device for a bicycle comprises a seat body, a bent frame, a front connecting unit, a rear connecting unit, a front fixing unit, and a rear fixing unit. The seat body converges from a rear portion to a front portion, and has a top face and a bottom face. The bent frame has a bent front end, and two diverging arms extending rearwardly from the front end. The front connecting unit is connected to the front end of the bent frame. The rear connecting unit is connected to the diverging arms of the bent frame. The front fixing unit is provided to fix the front connecting unit to the front portion of the seat body, and includes a stud that projects from one of the bottom face of the seat body and a top face of the front connecting unit along a line parallel to a top-to-bottom direction, and a socket that projects from the other one of the bottom face of the seat body and the top face of the front connecting unit to receive fittingly the stud of the front fixing unit. The rear fixing unit is provided to fix the rear connecting unit to the rear portion of the seat body, and includes a stud that projects from one of the bottom face of the seat body and a top face of the rear connecting unit along a line parallel to the top-to-bottom direction, and a socket that projects from the other one of the bottom face of the seat body and the top face of the rear connecting unit to receive fittingly the stud of the rear fixing unit.

According to another aspect of this invention, a seat device for a bicycle comprises a seat body, a bent frame, a front connecting unit, a rear connecting unit, a front fixing unit, and a rear fixing unit. The seat body converges from a rear portion to a front portion, and has a top face and a bottom face. The bent frame has a bent front end, and two diverging arms extending rearwardly from the front end. The front connecting unit is molded over the front end of the bent frame. The rear connecting unit is molded over the diverging arms of the bent frame. The front fixing unit is provided to fix the front connecting unit to the front portion of the seat body, and includes a stud that projects from one of the bottom face of the seat body and a top face of the front connecting unit along a line parallel to a top-to-bottom direction, and a socket that projects from the other one of the bottom face of the seat body and the top face of the front connecting unit to receive fittingly the stud of the front fixing unit. The rear fixing unit is provided to fix the rear connecting unit to the rear portion of the seat body, and includes a stud that projects from one of the bottom face of the seat body and a top face of the rear connecting unit along a line parallel to the top-to-bottom direction, and a socket that projects from the other one of the bottom face of the seat body and the top face of the rear connecting unit to receive fittingly the stud of the rear fixing unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
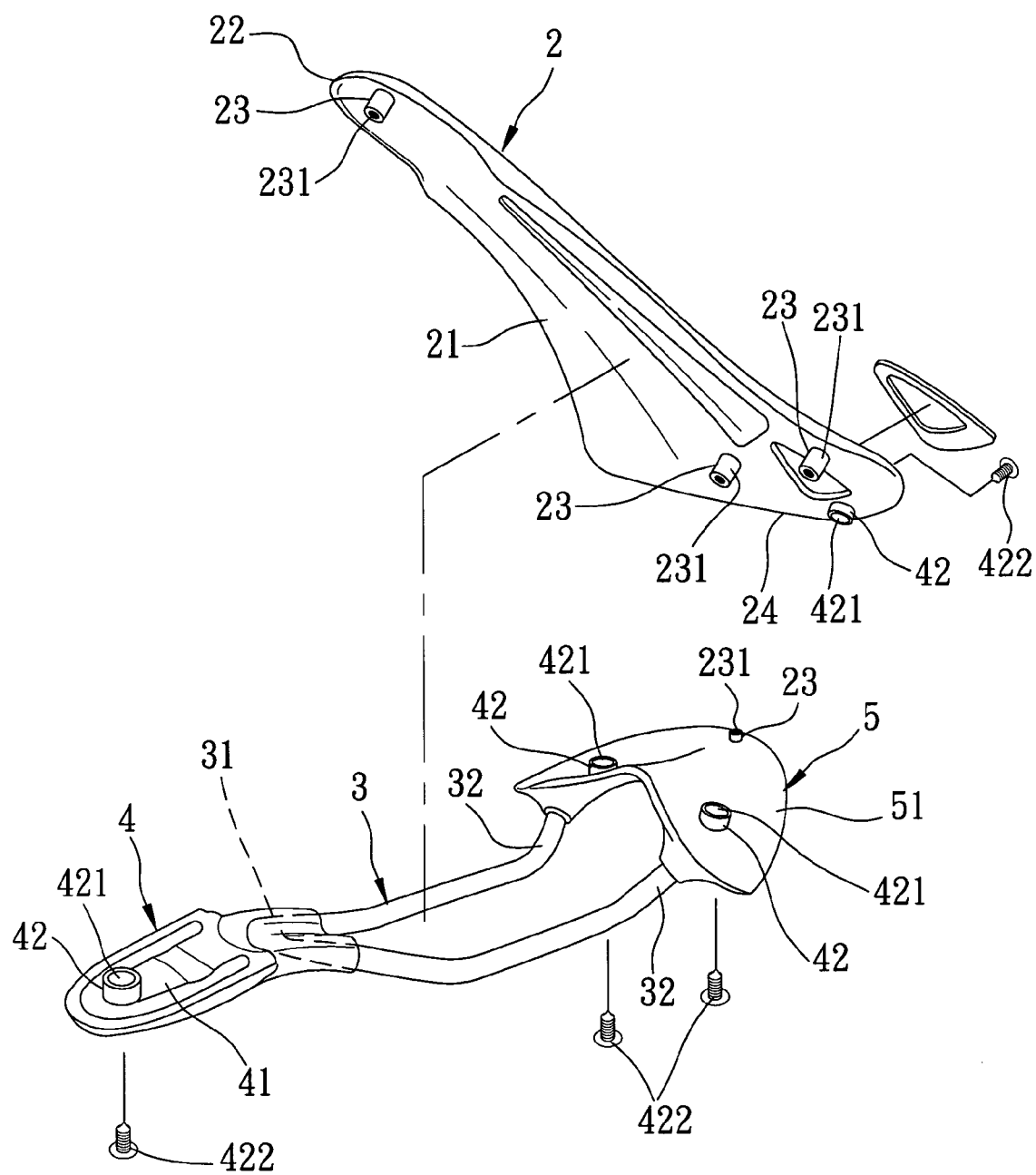
FIG. 2 is an exploded perspective view of the preferred embodiment of a seat device according to the present invention.
Figure 3:
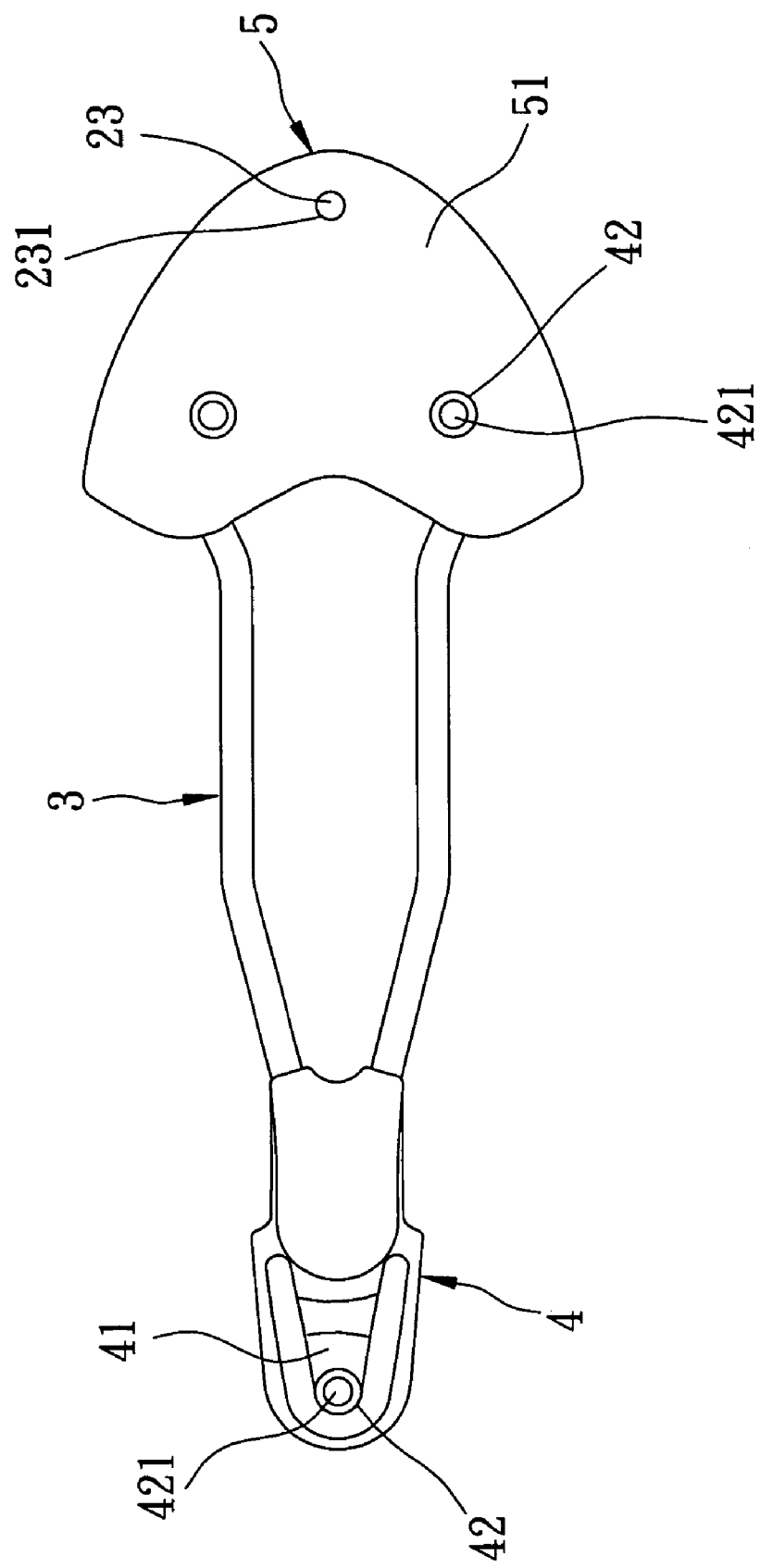
FIG. 3 is a schematic top view of a bent frame and front and rear connecting units of the preferred embodiment.
Figure 4:
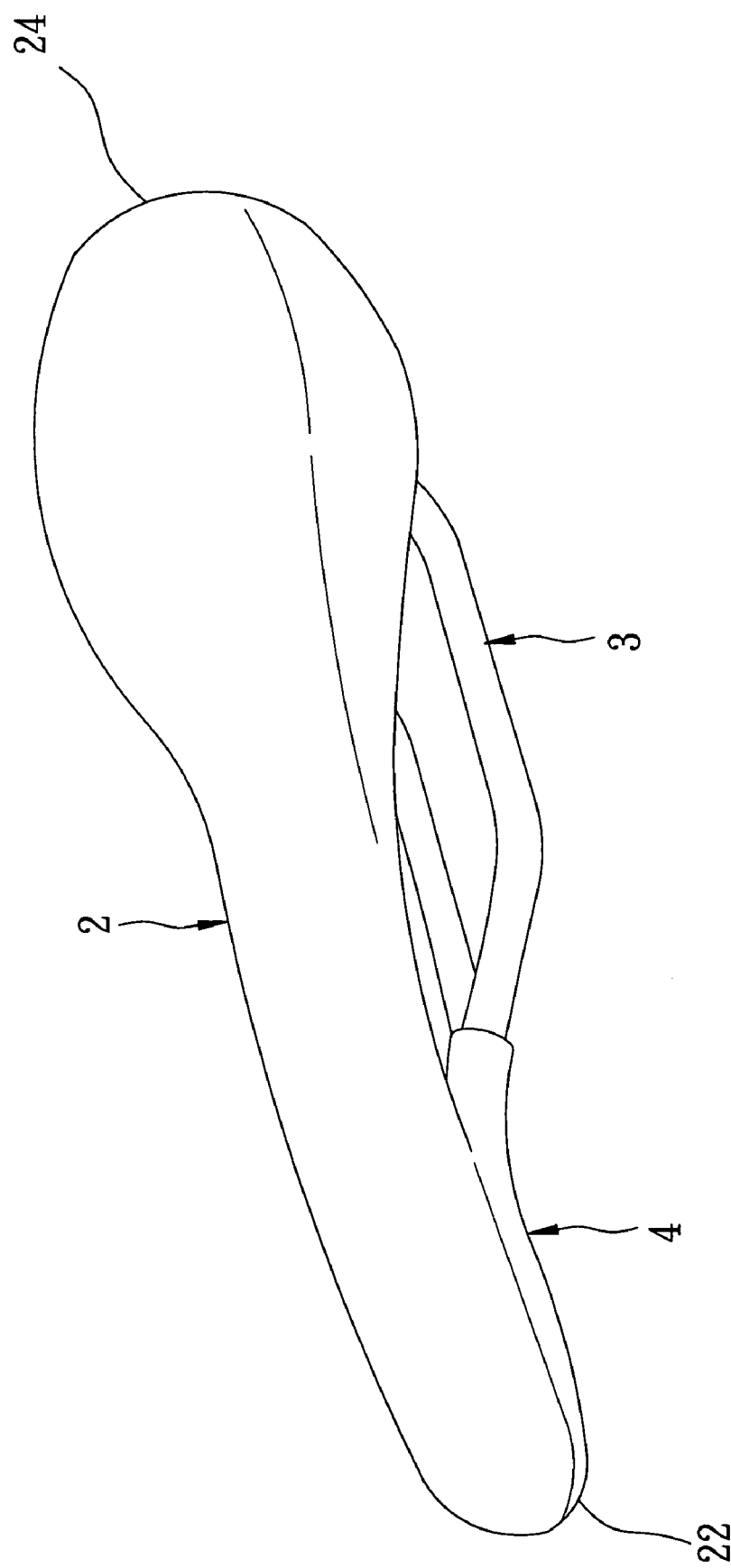
FIG. 4 is a perspective view of the preferred embodiment in an assembled state.

Referring to FIGS. 2 to 4, the preferred embodiment of a seat device according to the present invention is shown to comprise a seat body 2, a bent frame 3, a front connecting unit 4, and a rear connecting unit 5.

The seat body 2 converges from a rear portion 24 to a front portion 22, and has a top face and a bottom face 21.

The bent frame 3 has a bent front end 31, and two diverging arms 32 extending rearwardly from the front end 31.

The front connecting unit 4 is connected to the front end 31 of the bent frame 3, preferably by molding over the front end 31 of the bent frame 3, and has a shape substantially conforming to that of the front portion 22 of the seat body 2.

A front fixing unit is provided to fix the front connecting unit 4 to the front portion 22 of the seat body 2. The front fixing unit includes a stud 23, a socket 42, and a screw element 422. The stud 23 is hollow, has an internal thread 231, and projects downwardly from the bottom face 21 of the seat body 2 at the front portion 22 thereof along a line parallel to a top-to-bottom direction. The socket 42 has a through hole 421 for insertion of the stud 23, and projects upwardly from a top face 41 of the front connecting unit 4 to receive fittingly the stud 23. The screw element 422 passes through the through hole 421, and engages the internal thread 231.

The rear connecting unit 5 is connected to the diverging arms 32 of the bent frame 3, preferably by molding over rear ends of the diverging arms 32 of the bent frame 3, and has a shape substantially conforming to that of the rear portion 24 of the seat body 2.

A rear fixing unit is provided to fix the rear connecting unit 5 to the rear portion 24 of the seat body 2. The rear fixing unit includes two spaced-apart studs 23 and a socket 42 all projecting downwardly from the bottom face 21 of the seat body 2 at the rear portion 24 thereof along lines parallel to the top-to-bottom direction, two spaced-apart sockets 42 projecting upwardly from a top face 51 of the rear connecting unit 5 to receive fittingly and respectively the studs 23 of the rear fixing unit, and a stud 23 projecting upwardly from the top face 51 of the rear connecting unit 5 to insert fittingly into the socket 42 of the rear fixing unit. The structures of the studs 23 and the sockets 42 of the rear fixing unit are similar to those of the front fixing unit. Two screw elements 422 respectively pass through through holes 421 in the sockets 42 provided on the rear connecting unit 5, and respectively engage internal threads 231 in the studs 23 provided on the rear portion 24 of the seat body 2. Another screw element 422 passes through a through hole 421 in the socket 42 provided on the rear portion 24 of the seat body 2, and engages an internal thread 231 in the stud 23 provided on the rear connecting unit 5.

Since the bent frame 3 is integrally molded with the front connecting unit 4 and the rear connecting unit 5, and since the studs 23 and the sockets 42 are formed directly on the seat body 2 and the front and rear connecting units 4, 5, this integral assembly of the front and rear connecting units 4, 5 together with the bent frame 3 can be attached easily to the seat body 2. In particular, the front and rear connecting units 4, 5 are pressed against the bottom face of the seat body 2. During this operation, the socket 42 on the front connecting unit 4 is sleeved fittingly on the stud 23 at the front portion 22 of the seat body 2, the sockets 42 on the rear connecting unit 5 are sleeved fittingly on the studs 23 at the rear portion 24 of the seat body 2, and the stud 23 on the rear connecting unit 5 is inserted fittingly into the socket 42 at the rear portion 24 of the seat body 2. Securement of the front and rear connecting units 4, 5 to the seat body 2 is completed through engagement of the screws 422 with the respective studs 23.

Alternatively, the screws 422 may be dispensed with in the present invention. The sockets 42 and the studs 23 on the front and rear connecting units 4, 5 may be directly pressfitted to the studs 23 and the sockets 42 on the seat body 2, or attached through use of an adhesive.

Figure 5:
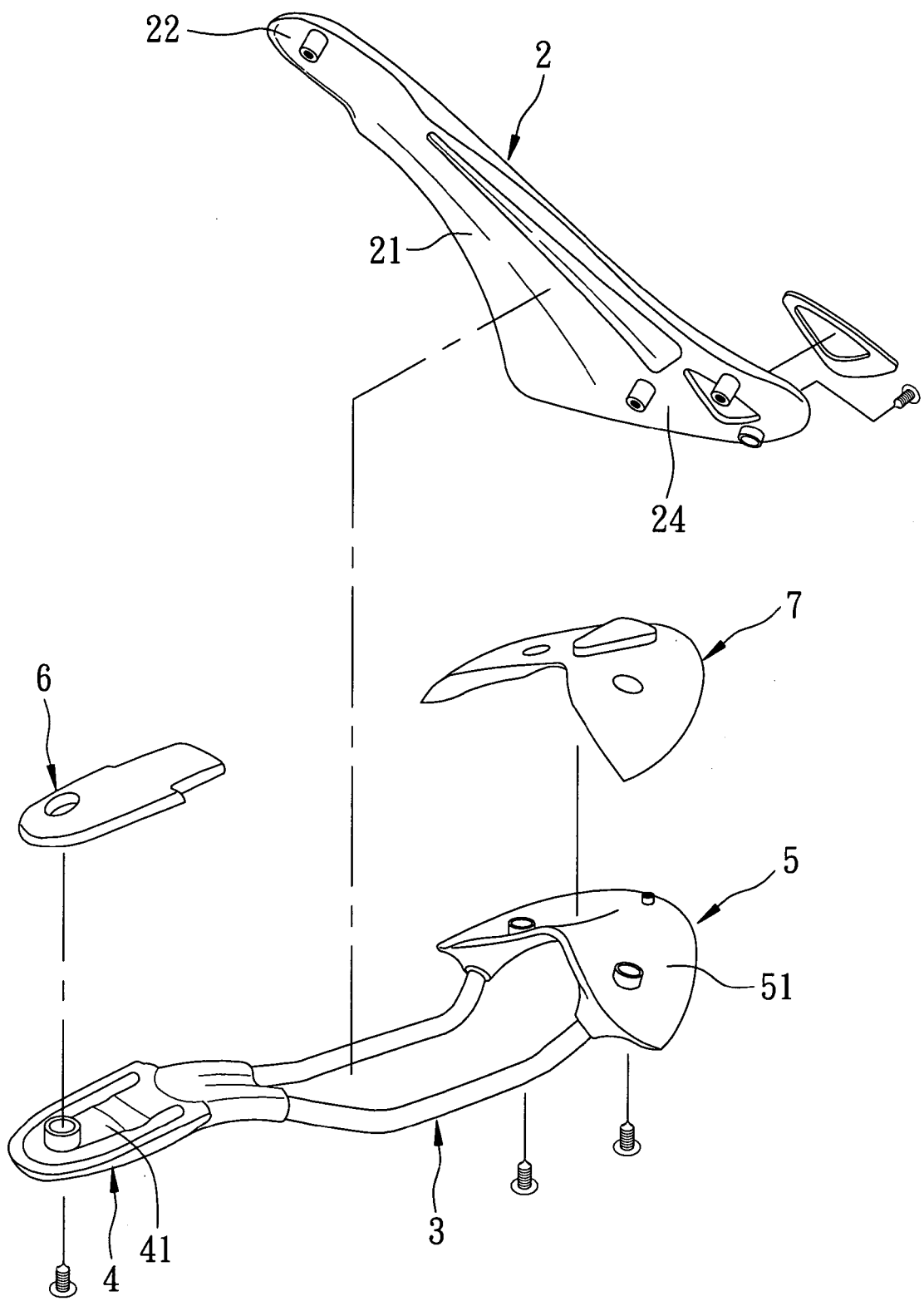
FIG. 5 is a view similar to FIG. 2, but including a front resilient cushion plate and a rear resilient cushion plate.
Figure 6:
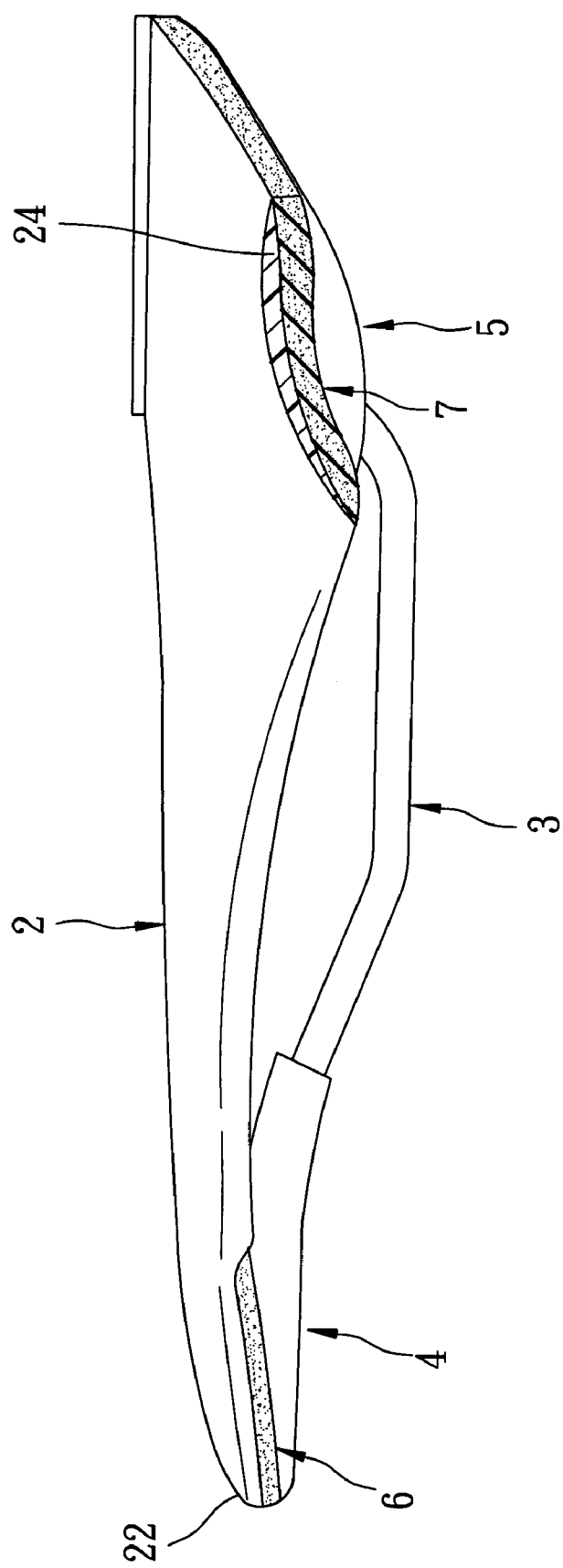
FIG. 6 is an assembled perspective view of FIG. 5.

Referring to FIGS. 5 and 6, the present invention may further include a front resilient cushion plate 6 sandwiched between the bottom face 21 of the seat body 2 at the front portion 22 thereof and the top face 41 of the front connecting unit 4, and a rear resilient cushion plate 7 sandwiched between the bottom face 21 of the seat body 2 at the rear portion 24 thereof and the top face 51 of the rear connecting unit 5. The front and rear resilient cushion plates 6, 7 act as buffers so that friction and shock between the seat body 2 and the front connecting unit 4 and between the seat body 2 and the rear connecting unit 5 may be reduced. The shock-absorbing function of the front and rear resilient cushion plates 6, 7 enhances sitting comfort.

Figure 1:
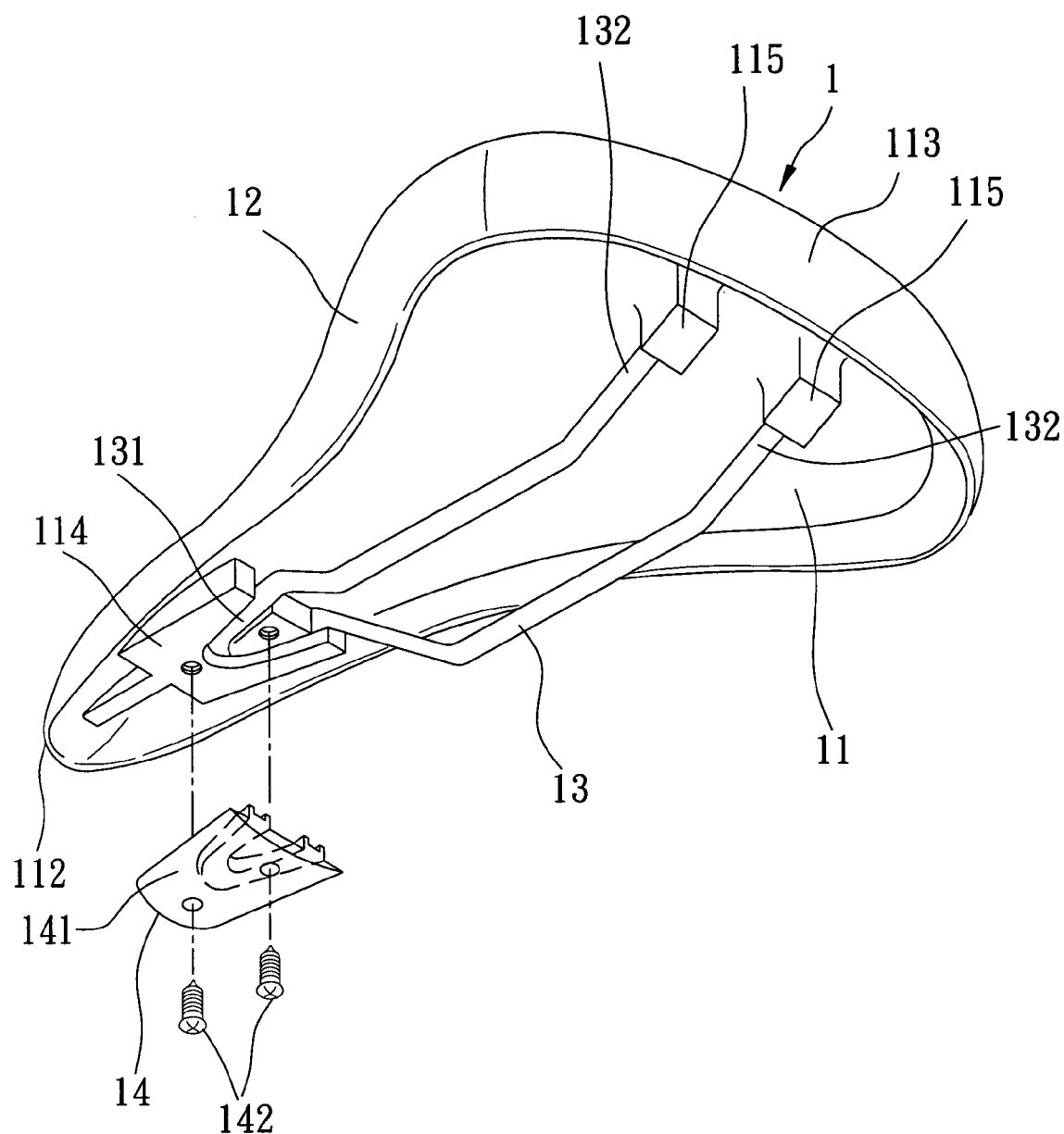
FIG. 1 is a partly exploded perspective view of a conventional seat device.

From the aforementioned description, the advantages of the seat device of the present invention can be summarized as follows:

1. Since the bent frame 3 is integrally molded with the front and rear connecting units 4, 5, only one connecting step is necessary to install the bent frame 3 on the seat body 2, so that assembly of the seat device of the present invention is very simple. Furthermore, since the positioning piece 114 (see FIG. 1) and the insert seats 115 (see FIG. 1), which are used in the conventional seat device 1 (see FIG. 1), are dispensed with in the present invention, the structure of the seat body 2 is simplified, thereby minimizing production costs.

2. Since the front and rear resilient cushion plates 6, 7 provide a buffer effect between the seat body 2 and the front connecting unit 4 and between the seat body 2 and the rear connecting unit 5, friction and shock between the same can be reduced, thereby providing sitting comfort.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A seat device for a bicycle comprising:
    a seat body converging from a rear portion to a front portion, and having a top face and a bottom face;
    a bent frame having a bent front end and two diverging arms extending rearwardly from said front end;
    a front connecting unit connected to said front end of said bent frame;
    a rear connecting unit connected to said diverging arms of said bent frame;
    a front fixing unit to fix said front connecting unit to said front portion of said seat body, said front fixing unit including a stud that projects from one of said bottom face of said seat body and a top face of said front connecting unit along a line parallel to a top-to-bottom direction, and a socket that projects from the other one of said bottom face of said seat body and said top face of said front connecting unit to receive fittingly said stud of said front fixing unit;
    a rear fixing unit to fix said rear connecting unit to said rear portion of said seat body, said rear fixing unit including a stud that projects from one of said bottom face of said seat body and a top face of said rear connecting unit along a line parallel to the top-to-bottom direction, and a socket that projects from the other one of said bottom face of said seat body and said top face of said rear connecting unit to receive fittingly said stud of said rear fixing unit; and
    a front resilient cushion plate sandwiched between said bottom face of said seat body and said top face of said front connecting unit, and a rear resilient cushion plate sandwiched between said bottom face of said seat body and said top face of said rear connecting unit; wherein said stud of each of said front and rear fixing units is hollow and has an internal thread, said socket of each of said front and rear fixing units having a through hole for insertion of said stud, each of said front and rear fixing units further including a screw element that passes through said through hole and that engages said internal thread.

2. A seat device for a bicycle comprising:
- a seat body converging from a rear portion to a front portion, and having a top face and a bottom face;
- a bent frame having a bent front end and two diverging arms extending rearwardly from said front end;
- a front connecting unit molded over said front end of said bent frame;
- a rear connecting unit molded over said diverging arms of said bent frame;
- a front fixing unit to fix said front connecting unit to said front portion of said seat body, said front fixing unit including a stud that projects from one of said bottom face of said seat body and a top face of said front connecting unit along a line parallel to a top-to-bottom direction, and a socket that projects from the other one of said bottom face of said seat body and said top face of said front connecting unit to receive fittingly said stud of said front fixing unit;
- a rear fixing unit to fix said rear connecting unit to said rear portion of said seat body, said rear fixing unit including a stud that projects from one of said bottom face of said seat body and a top face of said rear connecting unit along a line parallel to the top-to-bottom direction, and a socket that projects from the other one of said bottom face of said seat body and said top face of said rear connecting unit to receive fittingly said stud of said rear fixing unit; and
- a front resilient cushion plate sandwiched between said bottom face of said seat body and said top face of said front connecting unit, and a rear resilient cushion plate sandwiched between said bottom face of said seat body and said top face of said rear connecting unit;
- wherein said stud of each of said front and rear fixing units is hollow and has an internal thread, said socket of each of said front and rear fixing units having a through hole for insertion of said stud, each of said front and rear fixing units further including a screw element that passes through said through hole and that engages said internal thread.

3. The seat device of claim 2, wherein said rear connecting unit has a shape substantially conforming to that of said rear portion of said seat body, said front connecting unit having a shape substantially conforming to that of said front portion of said seat body.

* * * * *